April 23, 1968     T. E. ALVERSON ET AL     3,380,007
SHIELDED ARRANGEMENTS FOR ELECTRICAL TRANSFORMERS
Filed Dec. 27, 1966     2 Sheets-Sheet 1

WITNESSES
Theodore F. Wrobel
James F. Young

INVENTORS
Thomas E. Alverson
and Stephen G. Vargo
BY
Donald R. Lackey
ATTORNEY

United States Patent Office 3,380,007
Patented Apr. 23, 1968

3,380,007
SHIELDED ARRANGEMENTS FOR ELECTRICAL TRANSFORMERS
Thomas E. Alverson, Masury, and Stephen G. Vargo, Campbell, Ohio, assignors to Westinghouse Electric Corporation, Pittsburgh, Pa., a corporation of Pennsylvania
Filed Dec. 27, 1966, Ser. No. 604,967
7 Claims. (Cl. 336—70)

ABSTRACT OF THE DISCLOSURE

This invention relates to new and improved shielding arrangements for pancake coils of the type used to form the high voltage winding of core-form power transformers. Electrically conductive shielding members are disposed radially adjacent the inner and outer conductor turns of the pancake coils, and they are electrically connected to the outer and inner conductor turns, respectively, of their associated pancake coil.

---

Electrical windings of the type having a plurality of serially connected disc or pancake type coils, such as commonly used in transformers of the core-form type, distribute surge potentials non-uniformly across the turns of the coils, across the coils which make up the winding, and from the coils to ground. This is due to the fact that the initial distribution of a surge potential, particularly those having steep wave fronts and/or fall times, is due to the capacitive structure of the winding, rather than its inductive structure. This non-uniform distribution of surge potentials is undesirable, as it necessitates thicker insulation between the conductor turns of the coils, and thicker insulation between the first few coils which are adjacent the line terminal. The size and cost of the electrical inductive apparatus is thus adversely affected, without insuring that the winding will not fail upon a surge potential. Merely increasing the thickness of electrical insulation does not insure that the winding will not fail upon surge potentials, as increasing the thickness of the electrical insulation reduces the capacitance of the coils and the winding at the line end, which causes a still more unfavorable distribution of surge potentials. Further, as the voltage distribution across an electrical winding changes from capacitive to inductive, following a surge potential, voltage oscillations are produced within the winding, with the greater the difference between the capacitive and inductive voltage distributions, the larger the magnitude of the oscillations.

The distribution curve of the surge potential across a winding is responsive to the distribution constant alpha ($\alpha$) of the winding, which is equal to the square root of the ratio of the capacitance of the winding to ground, to the series or through capacitance of the winding. The smaller the distribution constant, the more uniformly a surge potential will be distributed across a winding.

Accordingly, it is an object of the invention to provide a new and improved winding structure for electrical inductive apparatus which aids in distributing surge potentials more uniformly across the winding structure.

Another object of the invention is to provide a new and improved winding structure for electrical inductive apparatus which reduces the distribution constant of the structure.

Still another object of the invention is to provide a new and improved winding structure for electrical inductive apparatus which has an improved surge voltage distribution characteristic, which may be constructed with very little increase in cost, and without substantially changing the conventional winding technique.

Briefly, the present invention accomplishes the above cited objects by providing an electrical shield radially adjacent the inner and outer turns of each pancake coil, with the inner and outer shields being connected to the outer and inner conductor turns, respectively, of its associated pancake coil. Thus, the coils are shielded from ground, and although the capacitance of the coils to ground is increased by the shields, the increase in series capacitance of the windings provided by the electrical shields more than offsets this increase, resulting in a smaller distribution constant. Further, the disclosed arrangement provides a low inductive charging path to each of the pancake coils in the winding from the line terminal, which charges the winding structure more rapidly than through the inductive path provided by the turns, which minimizes oscillatory circulating currents in the winding as the distribution of a surge potential changes from capacitive to inductive, and aids in distributing surge potentials more uniformly across the winding structure.

Further objects and advantages of the invention will become apparent from the following detailed description, taken in connection with the accompanying drawings, in which.

Figures 1, 2:
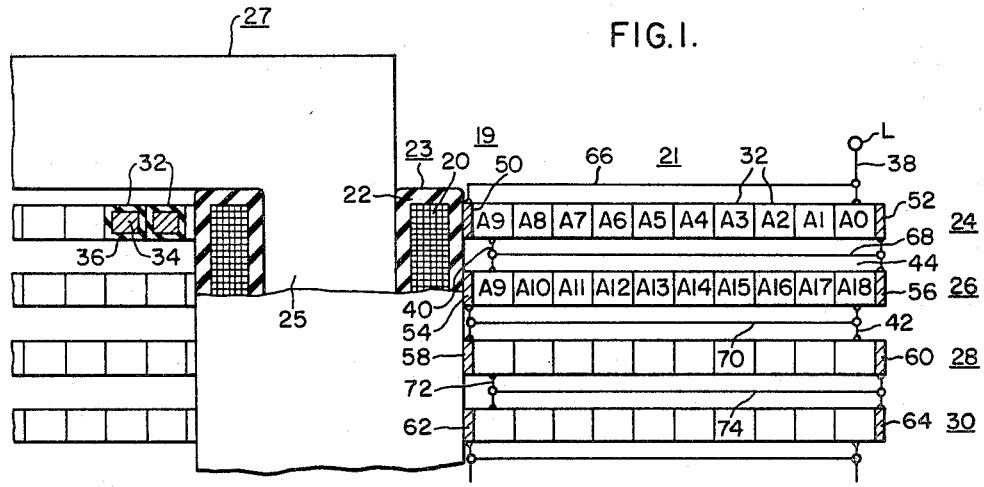
FIGURE 1 is a partial sectional elevation of the coil and windings of a transformer embodying the teachings of the invention.
FIG. 2 is an equivalent diagram of the winding structure shown in FIG. 1, illustrating the capacitive relationships of the various winding elements.

The invention relates generally to electrical winding structures of the type having a plurality of serially connected disc or pancake type coils. Broadly, the invention teaches the placement of electrical shields radially adjacent the inner and outer turns of the pancake coils, and their connection to the outer and inner turns, respectively, of their associated pancake coil. FIGURE 1 is a partial sectional elevation of a transformer illustrating a first embodiment of this concept.

More specifically, FIGURE 1 is a partial elevational view of a transformer 19, which may be single or polyphase, and of the isolated winding, or of the autotransformer type. For purposes of illustration, transformer 19 is shown as being of the isolated winding type, with only a portion of the complete phase being shown, as it clearly illustrates the teachings of the invention.

Transformer 19 includes high and low voltage winding structures, 21 and 23, respectively, concentrically disposed about a leg portion 25 of a suitable magnetic core 27. Low voltage winding 23 includes a plurality of conductor turns 20 insulated from magnetic core leg 25 and high voltage winding 21 by insulating means 22.

High voltage winding 21 is formed of a plurality of pancake or disc type coils, such as pancake coils 24, 26, 28 and 30, which are stacked in spaced side-by-side relation. Each of the pancake coils, such as pancake coil 24 includes a plurality of radially disposed conductor turns 32, formed of an electrical conductor having at least one conductive element 34 surrounded by suitable electrical insulating means 36. Each conductor turn may be divided into a plurality of axially and/or radially disposed conductors, if desired, in order to increase the current rating of the coils and winding.

Each of the pancake coils, such as pancake coil 24, is formed by radially winding an electrical conductor on a mandrel sized to provide a predetermined opening, with the radial winding process continuing until a predetermined number of conductor turns and a predetermined build or outer diameter is achieved. Thus, the inner conductor turn forms an inner surface and the outer conductor turn forms an outer surface, on each of the pancake coils. The pancake coils also have two major opposed surfaces formed by the turns. The plurality of pancake coils are then stacked in side-by-side spaced relation, with their openings in alignment, and they are serially connected from line terminal L at one end of the winding, to another line terminal at the other end of the serially connected coils, or the other end may be adapted for connection to ground, or it may be a neutral connection, depending upon the requirements of the winding arrangement.

Figure 4:
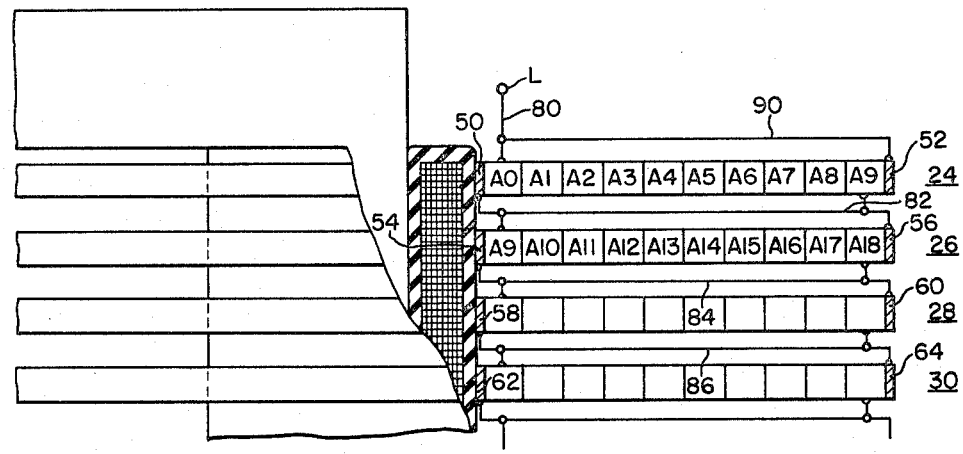
FIG. 4 is a partial sectional elevation of the core and windings of a transformer constructed according to still another embodiment of the invention.

The connection of the pancake coils 24, 26, 28 and 30 may be by the start-finish, finish-finish connections shown in FIG. 1, or they may be finish-start connected, as shown in FIG. 4. The "start" of a coil is the end of its inner turn, and the "finish" of a coil is the end of its outer turn, regardless of where the electrical circuit first enters the coil. Thus, in the arrangement shown in FIG. 1, the line terminal L may be connected to the end of outer turn A0 of line end pancake coil 24 via conductor 38, which is the "finish" of pancake coil 24, with the circuit spiralling inwardly via successive turns, until reaching the end of inner turn A9 which is the "start" of pancake coil 24. The "start" of pancake coil 24 is then connected to the "start" of pancake coil 26 via conductor 40, with the inner turn of pancake coil 26 being referenced A9, the same as the inner turn of pancake coil 24, to indicate that these turns are at substantially the same potential. The circuit then spirals outwardly via successive turns until reaching the end of turn A18, which is the "finish" of pancake coil 26. The finish of pancake coil 26 is connected to the "finish" of pancake coil 28 via conductor 42. The same arrangement is then continued until all of the pancake coils have been connected in series circuit relation. The pancake coils are stacked in spaced relation such that their facing major surfaces form ducts, such as duct 44 betwen pancake coils 24 and 26, for the passage of cooling fluid. When transformer 19 is disposed within a suitable tank (not shown) it is filled to a predetermined level with a suitable insulating and cooling fluid, such as $SF_6$ or oil, which fluid will flow in the cooling ducts between the pancake coils and facilitate the removal of the heat generated in the conductor turns.

In order to increase the through or series capacitance of the pancake coils, and thus of winding 21, to more uniformly distribute surge potentials across the turns of the coils, across the coils from one end of the winding to the other, and from the coils to ground, electrically conductive shielding means is disposed radially adjacent both the inner and outer conductor turns of each of the pancake coils. For example, shielding means 50 is disposed radially adjacent the inner surface of pancake coil 24, formed by turn A9, and shielding means 52 is disposed radially adjacent the outer surface of pancake coil 24, formed by turn A0. In like manner, shielding means 54 and 56 are disposed radially adjacent the inner and outer surfaces, respectively, of pancake coil 26, shielding means 58 and 60 are disposed radially adjacent the inner and outer surfaces, respectively, of pancake coil 28, and shielding means 62 and 64 are disposed radially adjacent the inner and outer surfaces, respectively, of pancake coil 30. While only four pancake coils are shown in FIG. 1, it will be understood that any number of pancake coils may be used, as required by the particular application.

The inner and outer shielding means of each of the pancake coils are electrically connected to the outer and inner turns, respectively, of their associated pancake coil. Thus, inner shielding means 50 of pancake coil 24 is connected to outer turn A0 of pancake coil 24 via conductor 66. The outer shielding means 52 and 56 of pancake coils 24 and 26, respectively, are connected to their inner turns A9. Since the ends of turns A9 are at substantially the same potential, shielding means 52 and 56 may be connected to the cross-over connection 40 between turns A9 of pancake coils 24 and 26, via conductor 68. In like manner, inner shielding means 54 and 58 of pancake coils 26 and 28 may be connected to the cross-over connection 42 via conductor 70, and outer shielding means 60 and 64 may be connected to crossover connection 72 via conductor 74. This sequence of connecting the inner and outer shielding means is followed to the completion of winding 21.

Since the inner and outer shielding means will carry only capacitive charging current, and not line current, they may be formed of a relatively thin electrical conductor, such as copper or aluminum foil, and they may have an axial dimension which is substantially the same as that of the electrical conductor which forms the conductor turns. Although the inner and outer shielding means are illustrated in the figures as being uninsulated, in actual practice they will have sufficient insulation to adequately insulate the voltage between the shielding means and the immediately adjacent turn, which will always be equal to the voltage drop across one coil.

The placement of the inner and outer shielding means radially adjacent the inner and outer surfaces of the pancake coils, and connecting the inner shielding means to the outer turn of its associated coil, and connecting the outer shielding means to the inner turn of its associated coil, provides many advantages. Instead of the turn-to-turn capacitance being connected in series during a surge potential, which produces an effective series capacitance value which is less than the capacitance between any two turns, it connects the turn-to-turn capacitances into a series-parallel network, which adds the values of the turn-to turn capacitances to the effective value of the series capacitance of the winding. This may be more readily understood by referring to FIG. 2, which is an equivalent diagram of winding 21, showing the capacitance between the turns of the pancake coils, referenced C1, the capacitance between the turns of adjacent pancake coils, referenced C2, the capacitance between the shielding means and the inner and outer turns, referenced C3, and the capacitance of the shielding means to ground, referenced C4.

The inner and outer shielding means of each pancake coil also shield each of the turns of its associated pancake coil from ground, reducing the leakage current from the coil turns to ground.

Another advantage of the disclosed arrangement, which may also be readily observed in the equivalent capacitance diagram shown in FIG. 2, is that the complete winding structure will be quickly charged by a surge potential, without requiring the charging current to flow through the inductive structure of the winding. In other words, each coil will be charged as rapidly as the line end coil. In prior art arrangements, the charging of the coils remote from the line end is delayed by the inductance of the windings, resulting in widely swinging oscillations as the various portions of the winding are charged. The rapid charging of all of the pancake coils is particularly beneficial on surge potentials which have chopped waveforms, and therefore very steep rise and/or fall times.

The disclosed arrangement may not appear to be beneficial in aiding a more uniform distribution of surge potential, as the capacitance of the winding to ground is increased. This is misleading, however, as the increase in the capacitance of the winding to ground is small compared with the increase in the series capacitance of the winding. Therefore, the net effect is a reduction in the value of the distribution constant alpha, and a more linear voltage distribution across the conductor turns, across the insulation and ducts between the pancake coils, and from the pancake coils to ground. This reduction in the magnitude of surge potential concentrations allows the turn-to-turn electrical insulation, and the electrical insulation between pancake coils to be reduced, which further increases the effective series capacitance of the coils and winding, further aiding in establishing a more uniform distribution of surge potential.

Figure 3:
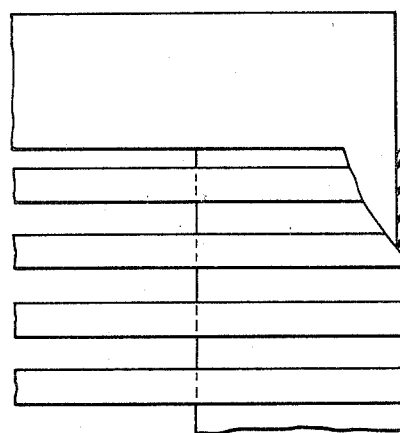
FIG. 3 is a partial sectional elevation of the core and windings of a transformer illustrating another embodiment of the invention.

While it is preferable to place the inner and outer shielding means adjacent the inner and outer surfaces of the pancake coils, because of the beneficial effect on ground leakage currents, the inner and outer shielding means may be placed between the first two inner turns, and between the first two outer turns, as shown in FIG. 3. Like reference numerals in FIGS. 1 and 3, as well as in the remaining figures, indicate like components. The advantage of placing the inner and outer shielding means between the first two inner and the first two outer turns, is a slight reduction in the capacitance of the coils to ground.

As hereinbefore stated, winding 21 may also be formed by serially connecting the pancake coils with finish-start connections. In other words, as illustrated in FIG. 4, line terminal L is connected to the start of the inner turn of pancake coil 24, which will now be called turn A0, via conductor 80. The "finish" of pancake coil 24 is connected to the "start" of pancake coil 26 via conductor 82, the "finish" of pancake coil 26 is connected to the "start" of pancake coil 28 via conductor 84, and the "finish" of pancake coil 28 is connected to the "start" of pancake coil 30 via conductor 86. The advantage of this arrangement is that all of the pancake coils may be wound and completed by machine winding. When using finish-finish, start-start connections, as shown in FIG. 1, all of the pancake coils in which the circuit starts at the outer turn and spirals inwardly requires that the machine wound coils be collapsed and rewound by hand.

The inner and outer shielding means of each pancake coil are still connected to the outer and inner turns of their associated coil sections, which results in the shielding means still being connected to the cross-over or the interconnection between the adjacent pancake coils. However, instead of adjacent inner and adjacent outer shielding means being connected together, as illustrated in FIG. 1, it results in the inner and outer shielding means of adjacent pancake coils being connected together.

More specifically, outer shielding means 52 is connected to line terminal L and inner turn A0 via conductor 90, and inner shielding means 50 is connected to outer turn A9 via the interconnection 82. The outer shielding means 56 of pancake coil 26 is connected to its inner turn A9, and this may be accomplished by connecting shielding means 56 to the interconnecting conductor 82. Thus, inner shielding means 50 of pancake coil 24 and outer shielding means 56 of pancake coil 26 are connected together. This sequence is then followed for the remaining pancake coils. The placement of the shield as shown in FIG. 3 may also be used with finish-start connections, as shown in FIG. 4.

In summary, there has been disclosed new and improved shielding arrangements for electrical windings, which require a minimum in the way of modification to conventional pancake coils. The advantages of the arrangement, however, are substantial, reducing the concentration of electrical stresses when surge potentials are applied to an electrical winding, reducing leakage currents to ground, minimizing transient oscillatory currents and voltages during the charging of the winding when the voltage distribution changes from capacitive to inductive, and reducing the insulation requirements between the turns of the pancake coils, and between adjacent pancake coils.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. An electrical winding structure comprising a
   plurality of pancake coils each having a
   plurality of radially disposed conductor turns, with the inner and outer conductor turns forming inner and outer surfaces, respectively, on each pancake coil,
   means connecting said plurality of pancake coils in electrical series circuit relation,
   first electrically conductive shielding means disposed radially adjacent a predetermined turn near the inner surface of each of said pancake coils,
   second electrically conductive shielding means disposed radially adjacent a predetermined turn near the outer surface of each of said pancake coils,
   conductor means directly connecting said first electrically conductive shielding means to the outer conductor turn of its associated pancake coil,
   and conductor means directly connecting said second electrically conductive shielding means to the inner conductor turn of its associated pancake coil.

2. The electrical winding structure of claim 1 wherein said first electrically conductive shielding means is disposed between the first two inner conductor turns, and said second electrically conductive shielding means is disposed between the first two outer conductor turns.

3. The electrical winding structure of claim 1 wherein said first electrically conductive shielding means is disposed adjacent the surface of the inner conductor turn which forms the inner surface of said pancake coils, and said second electrically conductive shielding means is disposed adjacent the surface of the outer conductor turn which forms the outer surface of said pancake coils.

4. The electrical winding structure of claim 1 wherein said plurality of pancake coils are connected in electrical series by start-start, finish-finish connections.

5. The electrical winding structure of claim 1 wherein said plurality of pancake coils are connected in electrical series by finish-start connections.

6. The electrical winding structure of claim 1 including magnetic core means, said plurality of pancake coils being disposed in side-by-side relation in inductive relation with said magnetic core means.

7. The electrical winding structure of claim 1 wherein said plurality of pancake coils forms the high voltage winding of an electrical transformer, and including magnetic core means and a low voltage winding, said high and low voltage windings being disposed in concentric adjacent relation about a portion of said magnetic core means.

No references cited.

DARRELL L. CLAY, *Primary Examiner.*

T. J. KOZMA, *Assistant Examiner.*